United States Patent [19]
Hinton

[11] Patent Number: 5,915,612
[45] Date of Patent: Jun. 29, 1999

[54] REGISTRATION SYSTEM FOR WEB FEEDING

[75] Inventor: Gaylen Roy Hinton, Merced, Calif.

[73] Assignee: Trine Manufacturing Company, Inc., Schaumburg, Ill.

[21] Appl. No.: 09/111,352

[22] Filed: Jul. 7, 1998

Related U.S. Application Data

[62] Division of application No. 08/553,836, Nov. 6, 1995, Pat. No. 5,821,724, which is a division of application No. 08/383,562, Feb. 3, 1995, abandoned, which is a division of application No. 08/078,693, Jun. 17, 1993, abandoned.

[51] Int. Cl.$^6$ ................................................. B65H 23/18
[52] U.S. Cl. ........................... 226/30; 226/42; 226/100
[58] Field of Search ............................. 226/28, 29, 30, 226/42, 100

[56] References Cited

U.S. PATENT DOCUMENTS

| | | | |
|---|---|---|---|
| 3,510,036 | 5/1970 | Lewis, Jr. et al. | 226/30 X |
| 3,583,128 | 6/1971 | Johnson et al. . | |
| 3,601,587 | 8/1971 | Thiede . | |
| 3,648,911 | 3/1972 | Pekrul | 226/30 |
| 4,221,144 | 9/1980 | Diesch et al. . | |
| 4,264,957 | 4/1981 | Pautzke . | |
| 4,297,623 | 10/1981 | Dupont . | |
| 4,318,176 | 3/1982 | Stratton et al. | 226/28 X |
| 4,361,260 | 11/1982 | Hanlan . | |
| 4,361,269 | 11/1982 | Hanlan . | |
| 4,381,637 | 5/1983 | Ballestrazzi et al. . | |
| 4,519,868 | 5/1985 | Hoffman . | |
| 4,552,608 | 11/1985 | Hoffman . | |
| 4,629,528 | 12/1986 | Tanaka et al. . | |
| 4,719,575 | 1/1988 | Gnuechtel | 226/28 X |
| 4,719,855 | 1/1988 | Cannon et al. . | |
| 4,868,759 | 9/1989 | Ross et al. . | |
| 4,891,764 | 1/1990 | McIntosh . | |
| 4,902,949 | 2/1990 | Hirata . | |
| 5,045,135 | 9/1991 | Meissner et al. . | |
| 5,187,420 | 2/1993 | Kajitani et al. . | |
| 5,204,932 | 4/1993 | Shinohara et al. . | |

FOREIGN PATENT DOCUMENTS

| | | |
|---|---|---|
| 0109266 | 5/1984 | European Pat. Off. . |
| 0311127 | 4/1989 | European Pat. Off. . |
| 0396749 | 11/1990 | European Pat. Off. . |
| 55-120388 | 9/1980 | Japan . |
| 57-135693 | 8/1982 | Japan . |
| 57-151883 | 9/1982 | Japan . |
| 58-58886 | 6/1983 | Japan . |
| 59-96802 | 6/1984 | Japan . |
| 62-071067 | 4/1987 | Japan . |
| 62-85694 | 4/1987 | Japan . |
| 3190584 | 8/1991 | Japan . |
| WO 8302341 | 7/1983 | WIPO . |
| WO 8402590 | 7/1984 | WIPO . |

*Primary Examiner*—Michael Mansen
*Attorney, Agent, or Firm*—Morgan & Finnegan, LLP

[57] ABSTRACT

An apparatus is disclosed for controlling the motion of a machine system so as to cut individual lengths from a web having graphics on predetermined web positions and which allows the use of an inexpensive AC induction motor. An AC induction motor has an output power shaft for imparting the motive force necessary to drive the machine system, such as a web feeding system. A sensor is operatively coupled to the AC motor for determining the position of the motor during system operation. A controller is operatively connected to the sensor and motor and forms a closed loop control circuit. The controller changes the feedback loop characteristics of the closed loop control circuit during a stop, hold or start condition of the motor. By adding an externally generated compensating signal to the input of the feedback loop, the controller also minimizes acceleration error. The controller also limits the value of a signal reaching the feedback loop of the control circuit to a given maximum value so as to eliminate any over-reaction of the system, while allowing a signal having less than a given threshold value to proceed unaffected to the feedback loop.

1 Claim, 3 Drawing Sheets

REGISTRATION SYSTEM FOR WEB FEEDING

CROSS-REFERENCE TO RELATED APPLICATIONS

This application is a divisional of Ser. No. 08/553,836 filed Nov. 6, 1995, now U.S. Pat. No. 5,821,724, which is a divisional application of Ser. No. 08/383,562 filed Feb. 3, 1995, now abandoned, which is a divisional application of Ser. No. 08/078,693, filed Jun. 17, 1993, now abandoned.

FIELD OF THE INVENTION

This invention relates to an apparatus and method for controlling the motion of a machine system, and more particularly to controlling the motion of a machine system so as to cut individual lengths from a web having graphics on predetermined web positions and which allows the use of an inexpensive AC induction motor in a demanding servo application.

BACKGROUND OF THE INVENTION

High speed labeling of containers requires accurate feeding of a web of film material into a cutting mechanism where the web of film is cut into labels which are subsequently applied onto containers. In many labeling apparatus, the web is fed onto a cutting drum where the web aligns with a cut point defined by the drum for cutting the web into labels. The cut labels are then transferred to a label transport drum where the label moves into a container wrapping position to engage a container for wrap around labeling.

During web feeding, it is essential that the web graphics align with predetermined positions along the path of travel so that the web is cut along areas defined by the web graphics to form cut labels. Typically, close control of web feed is maintained by the use of expensive differential transmissions which drive web engaging feed rolls. The position of the cutting drum or label transport drum are known throughout the labeling cycle by encoders operatively connected to a controller. The graphics on the web are sensed during web feeding and the transmissions are adjusted as necessary to ensure web feed cutting so that the labels are cut properly. Expensive servomotors have also been employed for web control in labeling machines.

Both differential transmissions and servomotors are expensive and it would be more desirable to use inexpensive AC induction motors for driving feed rollers. However, the AC induction motors have slower reaction time than servo motors, and therefore, up until the present invention, servomotors were used because of the rapidly changing feed speeds during production. Additionally, the acceleration error in closed loop control systems heretofore made use of even servo motors less than optimum, making the use of AC induction motors even less desirable.

SUMMARY OF THE INVENTION

It is therefore an object of the present invention to provide an apparatus and method for controlling the motion of a machine system by using an inexpensive AC induction motor in an application that ordinarily would require an expensive servo motor and controller.

It is another object to provide an apparatus and method for eliminating or reducing the acceleration error in a closed loop control system that has known modes of acceleration.

It is still another object of the present invention to cut individual lengths from a web having graphics on predetermined web positions where the web feed is driven by an AC induction motor with high response time.

In accordance with the present invention, the need for the loop to create an acceleration error in the output of the system is eliminated. An externally generated correction signal is added to the input of the feedback loop of the system. This correction signal corresponds to the acceleration error normally caused by an acceleration acting upon the closed loop control system. In one embodiment, the correction signal is a voltage equal to the difference between the steady state signal voltage that enters the feedback loop, and the signal voltage that would normally enter the loop during a given acceleration.

Additionally, the present invention is suited for controlling the motion of various machine systems using an AC induction motor having an output power shaft that imparts a motive force to the machine system. A sensor is operatively coupled to the motor for determining the position of the motor output shaft during system operation. A controller is operatively connected to the sensor and the motor for forming a closed loop control circuit. The controller limits the value of a signal reaching the feedback loop of the control circuit so as to eliminate any over-reaction of the system, while allowing a signal having less than a given threshold value to proceed unaffected to the feedback loop.

One embodiment of the present invention is also suited for cutting individual segments from a film web. A rotary cutter has a cutter blade mounted thereon. A stationary blade is positioned adjacent the rotary cutter and defines a cut point at which the film web is cut into individual segments when the cutter blade engages the stationary blade. A web feed system feeds the web to the rotary cutter for positioning and cutting the web at the cut point. A registration sensing system determines the position of web graphics relative to the cut point. A controller is operatively connected to the web feeding system and the registration sensing system for correcting the web positioning so that the required web graphics are cut at the cut point on the rotary cutter. Corrections to the web positioning occur during the first half rotation of the rotary cutter after the cutter blade and stationary blade engage each other.

These and other objects and advantages of the invention as set forth in the description which follows, and, in part, will be obvious from the description and advantages being realized and entertained by means of the instrumentation, facts, apparatus, systems, steps and procedures as particularly pointed out in the specification.

DESCRIPTION OF THE DRAWINGS

The foregoing and other objects and advantages of the present invention will be appreciated more fully from the following description, with reference to the accompanying drawings in which.

DETAILED DESCRIPTION OF THE INVENTION

Figure 1:
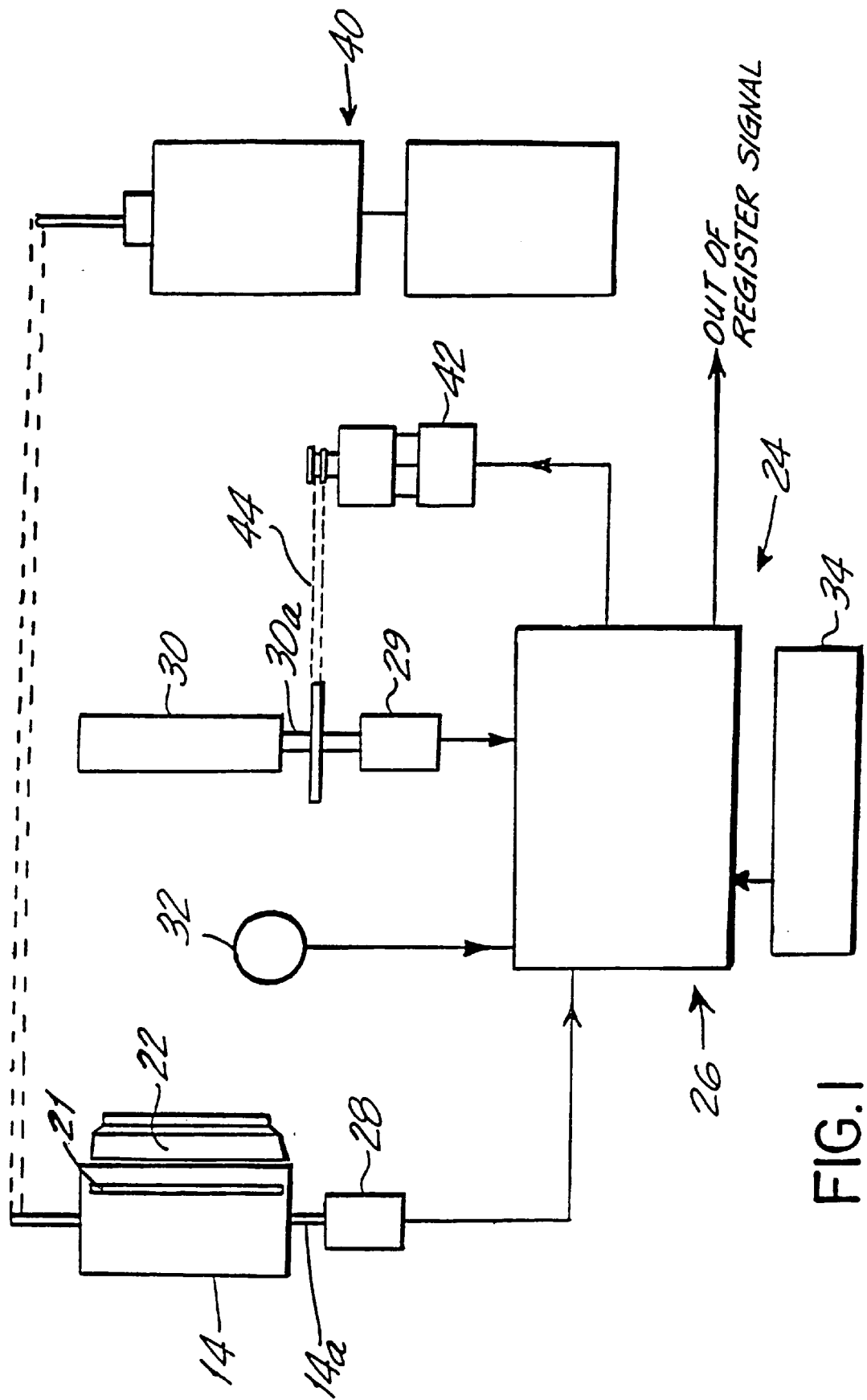
FIG. 1 is a schematic illustration of various components of the present invention and their operational relationship with the controller.
Figure 2:
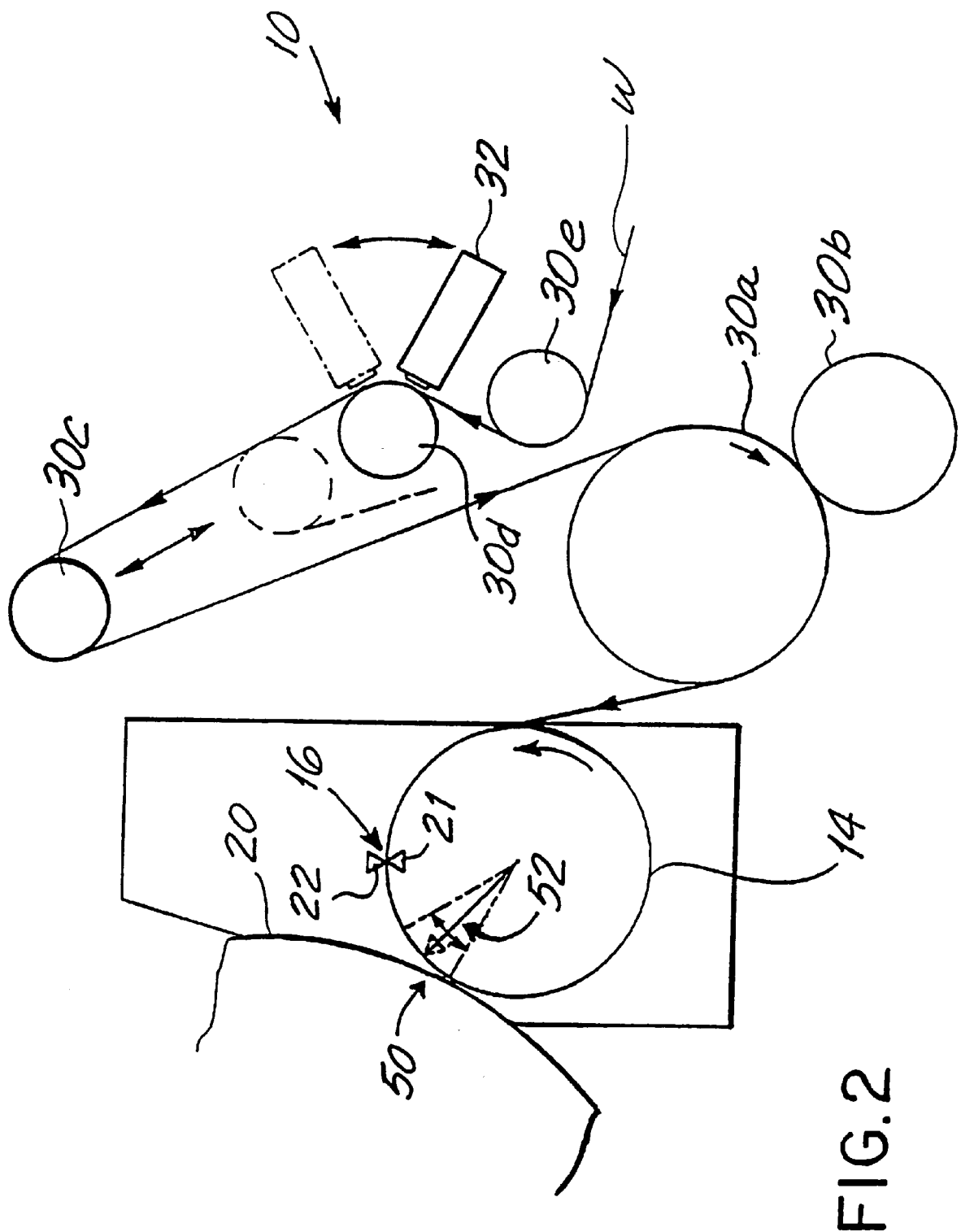
FIG. 2 is a schematic diagram of the web feed mechanism on a label machine using the apparatus of the present invention.

Referring now to FIGS. 1 and 2, apparatus 10 of the present invention is shown as a closed loop motor control system working as a web registration control on a web feeding mechanism for feeding a strip of film web material "W" onto a cutter drum 14 where the web is cut into labels at a cut point 16 and transferred onto a label transport drum 20. The cut point 16 is defined where a cutter blade 21 positioned on the cutter roll 14 engages a stationary blade 22 positioned adjacent the cutter roll 14.

The controller 24 (FIG. 1) of the invention includes a machine control board (CB) 26 which receives inputs, and gives outputs to the system. The shaft 14a of the rotary cutter 14 drives encoder 28. A feed roller 30 advances the web and also has a shaft 30a which drives encoder 29. Both of these encoders are connected into the CB, as is a scanner eye 32, typically known as a registration control scanner, which senses registration marks, or indices, which may correspond to the graphics on the web. The scanner 32 is movable relative to the path of travel the web follows to the cutter drum 14.

Additional system inputs into the CB 26 include those inputs from a PLC 34 or other source which could include signals for the scanner disable (for setting a scanner "window" of position), and digital data for a cut-point adjust (such as from a thumbwheel switch), a label feed input, a machine run input, a forward jog and a reverse jog. Outputs from the CB 26 are a signal to an AC drive powering the feed roller motor, and other digital and analog signals.

The cutter shaft 14a, and its associated encoder 28, are driven by the main machine drive motor, indicated generally at 40, and constitute the master axis. The feed roller 30 and its associated encoder 29 are therefore the slave axis. This slave axis is positioned by the CB 26 which controls a feed roller motor 42. The feed roller motor 42 is preferably an AC induction drive motor which is operatively connected to the feed roller shaft 30a by transmission means 44 such as a cog belt. The feed roller 30 is synchronized with the master shaft. The CB 26 monitors the relative position of the two encoders 28, 29 and generates a signal that appropriately speeds up or slows down the feed roller motor 42 to insure synchronization of the two shafts 14a, 30a.

The feed roller 30 is part of a larger web feed mechanism formed of several rollers 30a–e for moving the web along a predetermined path of travel to the cutter drum 14. One of the rollers 30c is preferably movable to change the length of web between the cutter drum 14 and sensor 32 so as to have an integral number of label lengths between the sensor 32 and cutter drum 14. As the feed roller 30 turns, it feeds the web onto the rotary cutter 14, best seen in FIG. 2. Once with each rotation of the cutter 14, the rotating blade 21 meets the stationary blade 22 at the cut point, and a length, such as a label, is cut from the web. The function of the present invention is to insure that this cut occurs in the correct position with respect to the label graphics and the desired length.

Once in each rotation of the cutter 14, the feed roller 30 should therefore feed one label of the appropriate length. However, there is the additional constraint that the label must be cut at the appropriate position relative to the printed graphics on the web. The function of the scanner eye 32 is to monitor the position of the web graphics to insure that this is so.

Once in each label length the scanner 32 senses a registration mark, or other index, on the graphics of the web. This signal causes the CB 26 to reset its count from encoder 29 to some predetermined value. If the position of the web graphics exactly coincides with the appropriate count of encoder 29, then the reset value is the same as the actual value, so nothing happens. However, if the position of the web graphics for that particular label is slightly ahead of or behind the desired position, then the encoder 29 count will be slightly increased or decreased appropriately. This will momentarily slow down or speed up the feed roller motor until the two encoder counts are again synchronized.

In accordance with the present invention, as seen in FIG. 2, the correction, indicated at 50, made by the scanner input, occurs shortly after the previous cut was made. This allows the system to have almost a complete revolution of the cutter 14 to stabilize the position of the web W before the next cut is made. This is crucial to high speed operation, and is one reason why the apparatus and method of the present invention can use an inexpensive AC induction motor instead of resorting to an expensive servo motor. The AC induction motor now does not have to react as fast. This feature also allows for the most accurate cutting of the labels because the system can never make a correction while the cut is being made.

Having the scanner correction occur just after the previous cut can be done by electronically delaying until that time. However, the preferred embodiment of this invention has that correction occur after the cut by the mechanical distance between the scanner 32 and the cut point 16. There is an integral number of label lengths between the scanner 32 and the correction position. This allows for an intuitive, mechanical adjustment of the cut point that makes it easy for unskilled operators to use. There is also another reason for this mechanical length correlation which will be discussed later. There is also an electronic fine tuning of the cut point, used in combination with the mechanical adjustment, which is discussed below. The combination of these two adjustment modes makes it very easy for an operator to initially set or fine tune the cut position of the label.

As seen in FIG. 2, there is a window 52 of electronic adjustment in the area of the correction 50. Once a mechanical adjustment of the cut point has been made, the cut point can be fine-tuned by means of the present invention. This fine tuning is accomplished by slightly varying the value that is loaded into the counter for encoder 29 when the scanner eye sees its index. In practice this fine electronic adjustment is made by toggling a thumb wheel switch (not shown in detail) or other means of entering digital data into the CB for adjusting the reset count of encoder 29. With this system, either mechanical or electronic adjustments of the cut point can be made while the machine is stopped, or "on-the-fly" during operation at any speed.

Figure 3:
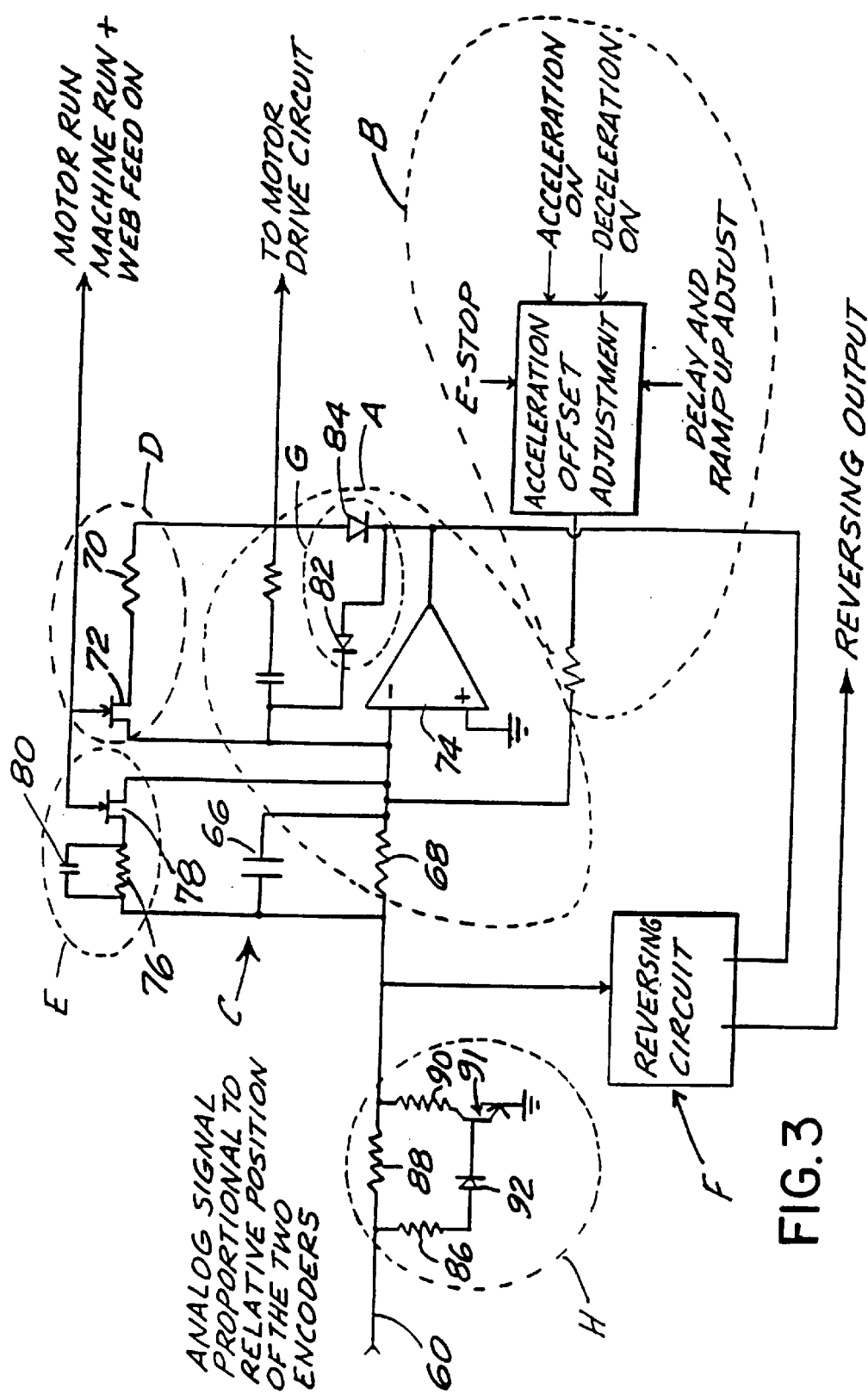
FIG. 3 is a simplified schematic drawing of a portion of the control circuitry of the invention, highlighting some of the novel aspects of one embodiment.

FIG. 3 highlights some of the novel features of the electronic feedback loop of the CB 26. The signal enters this circuit from the left as an analog signal 60 proportional to the relative position of the two encoders 28, 29. Such a signal 60 is easily obtainable from the encoder outputs by one skilled in the art. This signal is then processed by the circuit shown and eventually goes to control an AC variable frequency drive operatively connected to the feed roller motor 42.

Section A of FIG. 3 shows that at the heart of this control loop circuit is a standard integrator design (not including the diodes of section G). Such a design is well known to one skilled in the art of feedback control systems, and provides a control system that keeps the two encoders 28, 29 synchronized in any steady state condition with no velocity error. It gives a control system that provides integral plus proportional control.

With this integrator in the feedback loop, and a signal input proportional to the phase difference between the two encoders, this system becomes a second order phase-locked loop with two zeros in its transfer function. Although this system produces no steady state velocity error in the phase position of the two shafts, it does have the problem of acceleration error during periods of acceleration or deceleration. The net result of this acceleration error on the label machine described herein is that during acceleration periods the cut position is shifted with respect to the web graphics. (The labels are cut in the wrong place.) Also the integrator is not stable in a non-dynamic state (i.e., if the cutter shaft 14a is stopped in this example).

A major purpose of the present invention is to eliminate the undesirable effects of the standard integral plus proportional control feedback in a motor control application, such as with the described label machine.

In control theory, or with phase-locked loops, acceleration error caused by a constant acceleration can be eliminated by putting an additional integrator in the feedback loop. This creates a third order feedback loop. However, the addition of the second integrator in a motor control loop requires that the integration times be substantially long in order to maintain system stability. This creates a significant problem of reaction time to any changes. Therefore, even though such a control system will eventually eliminate the acceleration error, there will be a non-negligible response time, and a likely overshoot, as the system adjusts itself to compensate for the acceleration error. When the acceleration is stopped or changed there would also be an overshoot in the opposite direction. Such a system would also be sluggish in reacting to the corrections initiated by the scanner eye, which would limit the maximum speed at which the system could operate.

Section B of FIG. 3 shows a circuit that eliminates or minimizes the effect of acceleration error without the problems of the second integrator in the feedback loop. This circuit is made possible in the described labeling machine application by the fact that the accelerations and decelerations of the label machine are essentially constant and they are always of the same type. For example, normal accelerations and decelerations will be linear and usually the same rate, with one rapid linear deceleration made for emergency stops. Many other machine applications or motor controls also share this characteristic.

With one integrator in the feedback loop of a control circuit, a constant acceleration rate causes a constant acceleration error in the input phase relationship. The same acceleration will always cause the same amount of error, and this error is seen by the circuit of FIG. 3 as a change in the input analog signal.

The circuit in section B of FIG. 3 eliminates the acceleration error by adding a constant voltage to the integrator that is equivalent to the change in the input signal that would have come from the acceleration. This added voltage gives the integrator the offset it needs to follow the accelerating master signal, while simultaneously eliminating the phase or position error caused by the acceleration. The circuit of section B can add a different voltage, positive or negative as needed, to compensate for accelerations, decelerations, or emergency stops.

This circuit needs inputs from the control of the master signal (the machine powering the cutter shaft in the labeling machine example), to know when it is required to ramp up, ramp down, or emergency stop. Such signals are usually available in machine control applications. With these signals going into the circuit of section B, acceleration error can be virtually eliminated.

There are two other adjustments to the described circuit that dramatically improve the acceleration error response. One is the adjustment of the amount of offsetting voltage added for each acceleration. These values are a function of the acceleration rates and the time constants of the motor control system.

The second adjustment is a delay and ramp up of the added offset voltage. In a mechanical system there are always delays and reaction times incident to any change of velocity. By comparison, the offset voltage described above could be added almost instantaneously. Therefore, if when a signal that an acceleration is beginning is received from the master machine, there is a delay in reaction and a ramp up of the added voltage from zero to its final value, the net result will be more closely matched shaft positional relationships during any state of machine operation. This electronically delayed reaction needs to be matched to the mechanical reaction of the machine system. These described adjustments can be made using potentiometers, digital adjustments feeding a digital to analog converter, or other adjustment schemes.

As shown in section C of FIG. 3, a capacitor 66 is placed across the input resistor 68 of the integrator. This capacitor 66 adds derivative control to the feedback loop, something not normally done with phase-locked loops. However, in the present invention, this derivative control decreases the response time to corrections made by the scanner eye 32. This increases the maximum operational velocity of the system.

In section D of FIG. 3 a resistor 70 and an FET switch 72 shunt the feedback path of the integrator. The FET 72 is turned off while the controlled motor 42 is operating, leaving the feedback path unaltered. However, if the motor 42 is not running (when the web feed is off or when the web feed is on but the main machine drive is stopped), the FET 72 turns on. This alters the feedback path of the amplifier 74 so that it no longer acts as an integrator, but simply as an amplifier. This is useful for jogging the machine and for statically holding the web against tension. The usefulness of this feature will become more apparent as the reversing circuit is discussed later.

Section E shows a similar shunt having a resistor 76 and FET switch 78, across the input resistor 68 to the integrator. This can be activated at the same time as section D and serves to increase the gain while the integrator is off. (Although sections D & E can be actuated simultaneously, they also may be actuated independently). A capacitor 80 shunting the resistor 76 provides for additional derivative control for this higher gain condition, and improves response to jogging, starting and holding.

The two diodes 82, 84 of Section G in FIG. 3 are configured with the integrator amplifier to produce a precision rectifier in connection with the integrator. This combination provides for no integration and zero gain if the output of the integrator tries to swing positive. This is very useful because it keeps the integrator from ever integrating in the wrong direction, such as might occur if a correction large enough to hesitate the feed roller 30 were initiated by the scanner eye 32. If a reverse integration were allowed to occur, it would create an unacceptable overshoot as the system tried to re-synchronize itself.

When the feed roller motor 42 is stopped, there is often tension in the web it is holding, either in the reverse or forward direction. This will tend to start to move the feed roller 30 in the direction of the tension. If the movement is in the reverse direction, then the described circuit will sense a change in phase of the encoder 28. This will initiate a voltage that will move the feed roller 30 forward to its specified position. However, if the movement is in the forward direction, the described circuit cannot hold it back.

The circuit of section F is used to reverse the direction of the motor when needed in a stopped or holding mode. This circuit monitors the analog signal that feeds the integrator. If the signal indicates that the feed roller position is forward of where it should be, and the output of the integrator indicates that the feed roller motor is not running at an operation speed, a signal is sent to reverse the motor. Because this reversing is only used in a holding or static braking mode, (and because the diodes 82, 84 of section G do not allow integration or gain in the reversing mode) this application only provides single reversing speed, but that is sufficient to accomplish the purpose. This reversing circuit F is disabled when the output to the motor drive 42 is at a voltage that corresponds to an operational speed.

Because of the characteristics of an AC induction motor, it does not easily lend itself to statically holding a load without rotating, and there is also a minimum practical AC frequency which can be fed to the motor. Therefore, in a static holding or braking mode, the motor may not be locked in its position, but have some periodic movements backwards and forward. The lack of integration, increased gain, and derivative control in the braking mode given by sections D and E minimize these movements.

An additional feature of the reversing circuit that is important in using an AC motor in a braking mode is a dead zone between the forward and reverse modes. This allows a small window of positional movement in which the motor is not applying torque in either the forward or reverse directions. This dead zone is important to keep the system from fighting itself as it might try to oscillate from forward to reverse in the holding mode.

Section H of FIG. 3 shows a circuit addition that is important in using an AC induction motor in a servo application. This circuit includes resistors 86, 88, 90 a diode 92, and a transistor 91. This circuit monitors the magnitude of the input analog signal. If the signal is too large in the positive direction, this circuit will limit the value of the signal that goes into the feed back loop. It will limit the value of the signal to some maximum preset value. With the optimum performance values in the feedback loop, a large input offset could produce a large output signal that would over-drive the AC variable frequency drive that powers the motor.

Even if the AC drive were not overloaded, the motor itself, other mechanical components, or the web itself might be stressed or damaged by such a surge. The circuit of section H limits any output variations from a large positive input signal to be within the operating limits of the AC drive, the motor, and all other components. (A large negative signal is already limited because the reverse is always at one speed regardless of signal size.) The circuit of section H allows for high gain reactions to operating conditions, giving excellent control and high speed capabilities, but eliminates any problems to the system that would come from a high gain over-reaction.

Another benefit of the mechanical cut point adjustment system as depicted in FIG. 2 is that it compensates for the lack of precision of the AC motor in its static braking mode. Because the corrections to the feed roller position occur shortly after the cut point in the rotation of the rotary cutter 14 (approximately 45 degrees after), the scanner always sees the registration index at that same time. This means that when the label machine is idling, the web will be stopped with a registration index just slightly before the scanner.

When the machine stops feeding the web, the last cut occurs as the cutter blades meet in the rotation of the cutter. In order to insure that the last cut occurs in the correct location, the web needs to be moving in correct synchronization with the cutter shaft at the time the cut is made. Once the cut is made, the web feed can be stopped. If no reversal of the web is made, this would mean that the web would stop with its cut end protruding slightly through the cut point of the cutter. If the stationary blade were retractable, the web could stay in this position until the web feed started again. If the stationary blade were not retractable, a reversal of the web would have to occur before the next rotation of the cutter, or a small piece would be cut-off the end of the web. The present invention can work with either type of cutter. In either event, the web would be stopped, with the cutter still rotating, with its cut end either slightly before or slightly after the cut point of the cutter.

When the web feed is started again, it would be timed to start with the rotating cutter blade in approximately the same position as it was when the feed was stopped—just slightly after passing the cut point 16. That means that the web feed would start just slightly before the correction for that particular label would normally occur. If there was some inaccuracy in the positioning of the feed roller, shortly after starting the web feed, the scanner would see the registration index and precisely re-synchronize the machine with the label graphics, ready for the first cut. That inaccuracy could be due to the lack of precision of the induction motor in holding, due to an encoder position count corrupted by electrical noise over a long time period, the web slipping in relation to the feed roller, or even due to adjustments in the web position made intentionally or unintentionally by an operator while the machine was idling.

In summary, the following features of this invention make it possible to use successfully an AC induction motor in the demanding servo application of web registration on a labeling machine:

1. All corrections to the system occur almost a full cycle before the cut occurs.

2. Acceleration offset adjustments eliminate acceleration errors.

3. The integration is eliminated and the gain and derivative characteristics are changed in the feedback loop during static braking conditions.

4. A reversing circuit has a dead zone to allow for imprecise positioning of an AC induction motor.

5. A mechanical relationship exists between the scanning point on the web and the correction point on the cutter so that each time the system is started, a correction to the web graphics is made long before the first cut occurs.

6. The amount of offset permitted to reach the feedback filter is limited to allow high gain characteristics without excessive reactions.

Additionally, in accordance with the present invention, the imprecision of an AC induction motor is minimized because the encoder is not placed on the motor itself, but on the feed roller shaft. This allows for the correct positional control despite imprecise motors, backlash, slippage, or any other variable. With a reduction in speed between the motor and the feed roller, any imprecision in motor position is also reduced in the feed roller where the encoder is.

On the CB 26 there is preferably an LED labeled MARK. The purpose of this light in the present invention is to aid in installing the encoder on the master shaft (cutter shaft in the label machine). The encoder on the slave shaft is relative, and its value follows the master shaft, but the mechanical position of the encoder on the master shaft is critical. The LED on the CB lights up when encoder 28 is in its zero position. Therefore, to correctly align encoder 28, the machine can be jogged into the mechanical position that corresponds to the zero position. With the machine in that position, the encoder can then be rotated until the MARK LED on the CB lights up. The encoder then can be locked in that position, and the alignment is complete. This allows for a simple and virtually fool-proof way to align the master encoder in setting up the machine.

Another feature of the preferred embodiment that makes operation much easier is the label jog. This is a jog switch that allows the web to be slowly moved in either direction to position it for correct operation. The forward and reverse jog speeds are both slower than typical speeds encountered in machine operation. In connection with this jog switch is a count disabling signal that goes to the CB. This allows the web to be moved to any new position without changing the current count associated with the feed roller, giving the same effect as repositioning the web by hand and reclamping it in the feed roller.

In order for the present invention to control web registration, particularly in light of the fact that web graphics can vary so widely, the scanner needs to be able to discriminate between a registration index and other marks on the graphics. This discrimination can be easily accomplished by positional discrimination because the registration index only occurs once in each label length, and always in the same relationship with the rest of the graphics. Therefore, the CB of the present invention has provision to create a window of operation for the scanner, only allowing it to make a correction reset when the cutter of the labeling machine is in the area of the "window of electronic adjustment" as noted in FIG. 2. The CB also allows for only one reset per cycle, regardless of how many times the scanner itself may trigger on during the specified window.

One problem associated with any registration control system is the need to eliminate the production of bad products because the system was out of register. The present invention addresses that problem by providing an out of register signal as seen in FIG. 1. This signal can be used to shut down the machine and trigger an alarm, or somehow else alerting the operator that the machine is out of register. This is accomplished by monitoring whether or not a correction reset was made by the scanner input each time a cut is made. If no reset occurs, then the scanner did not see the index, the web was out of position, or something else was wrong. After a predetermined number of cycles that no reset was made (typically set at 2 to 8 cycles), the out of register signal would be activated. As it takes a number of machine cycles between when the scanner sees the index and finished product is discharged from the machine, this out-of-register control signal, if allowed to shut down the machine, would effectively eliminate the possibility of out of register products being produced.

It should be understood that the foregoing description of the invention is intended merely to be illustrative thereof, and that other embodiments, modifications and equivalents may be apparent to those skilled in the art without departing from its spirit.

That which is claimed is:

1. An apparatus for feeding a web where the web includes web graphics, comprising means for feeding a web along a predetermined path of travel, a sensor for sensing web graphics and determining the position of the web along the predetermined path of travel based on the sensed graphics, means operatively connected to said sensor for correcting the position of the web based on the sensed graphics, and counting means for counting the number of web feeding cycles which consecutively occur without a correction initiated by said sensing means, said counting means including signal generating means for generating an output signal when the count reaches a predetermined value.

\* \* \* \* \*